US009873637B2

(12) United States Patent
Mateo et al.

(10) Patent No.: US 9,873,637 B2
(45) Date of Patent: Jan. 23, 2018

(54) ANTI-FILMING SURFACE-ACTIVE AGENT

(75) Inventors: Sandrine Mateo, Ury (FR); Pascal Boustingorry, Breuillet (FR); Bruno Pellerin, Avon (FR); David Sedan, Castelnau-d'Estrétefonds (FR)

(73) Assignee: CHRYSO, Issy les Moulineaux (FR)

( * ) Notice: Subject to any disclaimer, the term of this patent is extended or adjusted under 35 U.S.C. 154(b) by 0 days.

(21) Appl. No.: 13/386,641

(22) PCT Filed: Aug. 6, 2010

(86) PCT No.: PCT/FR2010/051666
§ 371 (c)(1),
(2), (4) Date: Apr. 9, 2012

(87) PCT Pub. No.: WO2011/015792
PCT Pub. Date: Feb. 10, 2011

(65) Prior Publication Data
US 2012/0186495 A1    Jul. 26, 2012

(30) Foreign Application Priority Data

Aug. 7, 2009  (FR) ..................................... 09 55586

(51) Int. Cl.
| | | |
|---|---|---|
| *C04B 24/02* | (2006.01) | |
| *C04B 28/02* | (2006.01) | |
| *C04B 40/00* | (2006.01) | |
| C04B 103/56 | (2006.01) | |
| C04B 111/00 | (2006.01) | |
| C04B 111/21 | (2006.01) | |
| C04B 111/34 | (2006.01) | |

(52) U.S. Cl.
CPC ............ *C04B 24/026* (2013.01); *C04B 28/02* (2013.01); *C04B 40/0039* (2013.01); *C04B 2103/58* (2013.01); *C04B 2111/00103* (2013.01); *C04B 2111/21* (2013.01); *C04B 2111/34* (2013.01)

(58) Field of Classification Search
CPC ... C04B 20/1025; C04B 24/026; C04B 11/00; C04B 28/02; C04B 40/0039; C04B 20/026; C04B 14/28; C04B 20/008; C04B 14/06; C04B 14/106; C04B 14/303; C04B 2103/58; C04B 2111/00103; C04B 2111/34; C04B 2111/21
USPC ........ 106/823, 802, 810, 244, 708, 724, 737, 106/775
See application file for complete search history.

(56) References Cited

U.S. PATENT DOCUMENTS

| | | | | |
|---|---|---|---|---|
| 2,979,415 A | * | 4/1961 | Taylor ............................ | 106/680 |
| 3,486,916 A | | 12/1969 | Cordon | |
| 6,010,596 A | * | 1/2000 | Song ....................... | C04B 28/14 |
| | | | | 106/660 |
| 6,828,382 B1 | * | 12/2004 | Loth ................... | C09D 133/062 |
| | | | | 156/330.9 |
| 6,849,118 B2 | | 2/2005 | Kerkar et al. | |
| 2006/0100341 A1 | | 5/2006 | Mosquet et al. | |
| 2008/0019773 A1 | * | 1/2008 | Stadtbaumer et al. ......... | 404/67 |
| 2010/0210776 A1 | | 8/2010 | Mosquet et al. | |
| 2011/0003925 A1 | * | 1/2011 | Hauk .................... | C04B 24/085 |
| | | | | 524/399 |
| 2012/0186495 A1 | | 7/2012 | Mateo et al. | |

FOREIGN PATENT DOCUMENTS

| | | | |
|---|---|---|---|
| CN | 102114166 | 7/2011 | |
| DE | WO 2009083129 A2 * | 7/2009 | ........... C04B 24/085 |
| EP | 0249408 A1 * | 5/1987 | |
| FR | 1329281 | 6/1963 | |
| FR | 2928915 A1 | 9/2009 | |
| FR | 2 948 930 | 2/2011 | |
| GB | 654 930 | 7/1951 | |
| GB | 1 402 597 | 8/1975 | |
| JP | 2006-193416 | 7/2006 | |
| WO | WO 95/04008 | 2/1995 | |
| WO | WO 03/101910 | 12/2003 | |
| WO | WO 2008035221 A2 * | 3/2008 | |
| WO | WO 2009/036128 A1 | 3/2009 | |

OTHER PUBLICATIONS

Dunnous, Jack. "Concrete Coloring with Iron Oxide Pigment". Oct. 1997 [Retrieved on Jun. 5, 2013]. Retrieved from http://www.archimg.com/hamburger/H1-doc.htm#item12.*
Khatib, Jamal. "Sustainability of construction materials". Woodhead Publishing. 2009. Retrieved from https://books.google.com/books?id=4VCkAgAAQBAJ&pg=PA249&lpg=PA249&dq=anhydrite+and+efflorescence&source=bl&ots=8vp36xJo7r&sig=KjQC1qmwN-YQZPH03CZG236muhw&hl=en&sa=X&ei=2_GCVZaDG4bn-QGes6OYCA&ved=0CDsQ6AEwBQ#v=onepage&q=anhydrite%20and%20efflorescenc.*
Hegger; Ausch-Schwelk; Fuchs; Rosenkranz. "Construction Materials Manual". 2006. pp. 57. Retrieved from https://books.google.com/books?id=4c3TAAAAQBAJ&pg=PA57&dq=mortar+gypsum+and+sand+and+additives&hl=en&sa=X&ved=0ahUKEwjt3K7A25fKAhUU5WMKHQD8BA8Q6AEIPzAD#v=onepage&q=superplasticiser&f=false.*
"Cement—Superplasticizer Compatibility". Retrieved from http://www.theconcreteportal.com/compat.html.*
Int'l Search Report & Written Opinion dated PCT/FR2010/051666 (2011).
Kong, J. 2011 Database WPI Week 201156 Thomson Scientific, London GB; An 2011-J99313 XP002685433; "Chinese medicinal ointment and manufacturing method thereof."

* cited by examiner

*Primary Examiner* — Anthony J Green
(74) *Attorney, Agent, or Firm* — Knobbe, Martens, Olson & Bear, LLP

(57) ABSTRACT

The invention relates to an anti-filming surface adjuvant for hydraulic binders comprising at least one fat and at least one anti-caking agent, to its preparation method as well as to a method for preparing a hydraulic binder composition suitable for making screeds or self-compacting concretes (SCC) including the step consisting of adding to the hydraulic binder the adjuvant according to the invention at a dosage comprised between 50 and 1,500 g/m$^3$ of screed or of concrete.

15 Claims, No Drawings

ANTI-FILMING SURFACE-ACTIVE AGENT

CROSS REFERENCE TO RELATED APPLICATIONS

This application is a U.S. nationalization under 35 U.S.C. §371 of International Application No. PCT/FR2010/051666, filed Aug. 6, 2010, which claims priority to French application no. FR0955586, filed Aug. 7, 2009. The disclosures set forth in the referenced applications are incorporated herein by reference in their entireties.

The present invention relates to a novel admixture for hydraulic compositions, to its preparation method as well as to its method of use.

It is customary to cast mortar screeds onto the ground in order to flatten, level or surface a support and/or coat a heating floor in order to then receive upper layers (all types of support: tiling, flexible flooring, floating or laminated flooring, etc.).

After casting, setting and drying at the surface of screeds, the appearance of a surface film is frequently observed with a thickness of a few hundredths of millimeters formed with particles based on calcium hydrates moving up to the surface. The fine film has folds and inesthetical flakings and considerably reduces the surface adherence capacities of finishing materials intended to subsequently cover the screeds, such as plaster, ceramics, paints, various coatings or other materials.

This type of film is also observed at the surface of other hydraulic compositions such as self-compacting concrete (SCC), a concrete capable of setting itself into place in even complex and constricted forms under the sole effect of gravity.

In order to obtain sufficient adherence of the finishing materials to the surface, it proves to be necessary to brush, scrape or sand down the surface before beginning with the finishing work in order to remove the film therefrom. This work is long and expensive.

The use of an admixture comprising an anti-shrinkage agent of the alkylene oxide type and a fatty alcohol is known from U.S. Pat. No. 6,849,118 in order to prevent the formation of surface dusts caused by the anti-shrinkage agent.

Moreover the use of $C_{14}$-$C_{22}$ fatty alcohols is known from WO 95/04008 for inhibiting efflorescence in cement compositions, preferably as an emulsion. The efflorescence however differs from the described particle film in that it results from a carbonatation reaction of calcium salts at the surface of cement compositions.

Because of their low melting point and of their hydrophobicity, fatty alcohols are however difficult to disperse and rapidly agglomerate under heat or even during storage under their own weight, which makes their use difficult.

The object of the present invention is therefore to propose an admixture for reducing the formation of films on horizontal surfaces of hydraulic compositions, in an easily dispersible form and which is stable at temperatures comprised between –10° C. and 60° C., as well as during storage.

According to the invention, this problem is solved by the use of an admixture including at least one fat and at least one anti-caking agent.

According to a first aspect, the invention therefore aims at an anti-surface film forming admixture for hydraulic binders comprising at least one fat and at least one anti-caking agent.

The term of <<fats>> is meant to designate compounds including a polar function and a carbonaceous chain including more than 8 carbon atoms, notably fatty alcohols.

The term of <<hydraulic binder>> is meant to designate cement compositions such as Portland cements, the mortars further comprising fine granules and the concretes further comprising coarse granules. The term also encompasses anhydrous or hydrated calcium sulfates.

According to the invention, the anti-surface film forming admixture for hydraulic binders comprises at least one fat and one anti-caking agent.

The fat may notably be a fatty alcohol or a compound derived from a fatty alcohol. Preferably it includes 8 to 22 carbon atoms, preferably 10 to 18 carbon atoms and most particularly 16 to 18 carbon atoms, advantageously as a carbonaceous chain. The carbonaceous chain may be linear or branched, saturated or unsaturated. Preferably, the fat is a primary fatty alcohol, in which the alcohol group is found at the end of the chain.

Fats including a linear saturated carbonaceous chain such as hexadecan1-ol and octadecan-1-ol or one of their mixtures are more preferred.

The admixture according to the invention may contain a single fat or more, for example when this is a fat of natural origin.

The anti-caking agent allows the admixture according to the invention to remain as a fine and dispersed powder. This presentation not only allows homogeneous dispersion into the hydraulic binder but moreover ensures storage stability at room temperature and up to 60° C.

The anti-caking agent is generally an inert mineral compound which is solid at room temperature. Preferably, the anti-caking agent is finely divided.

Advantageously, the solid anti-caking agent has an average particle size comprised between 0.1 and 100 µm and preferably comprised between 0.5 and 5 µm. A particle size of the order of 1 µm is more preferred. Indeed, in the presence of a finely divided anti-caking agent, the film formation inhibiting capacity of a fat varies very little with temperature.

More preferred anti-caking agents are mineral compounds such as oxides, silicates and carbonates which interfere very little or not at all with the setting of the hydraulic composition. Among these mineral compounds, calcium carbonate, kaolin, alumina or silica are more preferred.

Among these compounds, calcium carbonate is inexpensive, available and consequently more preferred.

Moreover, it was found that certain anti-caking agents are colored and may consequently also ensure the function of a coloring agent. More preferred colored anti-caking agents are iron oxides.

The admixture preferably comprises between 10% and 99% by weight of fat and 90% to 1% by weight of anti-caking agent, preferably 40 to 60% by weight of fat and 60 to 40% by weight of anti-caking agent and most particularly about 50% of fat and 50% of anti-caking agent.

Advantageously, the admixture according to the invention consists of the two mentioned components. However, in certain cases it may be useful to add other agents, notably anti-foam agents, plasticizers, notably superplasticizers, setting modifiers.

The admixture according to the invention may further comprise a mineral or organic coloring agent in addition to the selected anti-caking agent. The amount of coloring agent in the admixture according to the invention may for example be comprised between 100 and 200% by weight based on the mixture of fat and anti-caking agent.

The preparation of the admixture according to the invention is rapid and easy and may be achieved with simple means. According to another aspect, the invention therefore aims at a method for preparing an admixture according to the invention, including the steps:
(i) cryomilling the fat until the desired grain size is obtained; and
(ii) mixing the fats milled with the anti-caking agent and the other constituents of the admixtures, if necessary.

As indicated above, the desired grain size of the fat is preferably an average particle size of the order of 0.1 to 200 μm.

The thereby obtained admixture appears as a fluid powder and may then be packaged without any difficulties in a flask, in a bag which is either disintegratable before use or not. The thereby conditioned admixture is stable upon storage for several months even at high temperature.

The presentation as a fluid powder moreover considerably facilitates the application of the admixture according to the invention.

Indeed, the admixture according to the invention is a bulk admixture and not a surface admixture. It is therefore advantageously dispersed homogeneously into the bulk of hydraulic binder, before, during or after mixing.

Preferably, the admixture according to the invention is added to the dry hydraulic binder, before mixing. Indeed, by the presence of the anti-caking agent, the admixture preferably appears as a fluid powder which may be easily dispersed into the bulk of hydraulic binder.

Generally, the dosage of the admixture according to the invention is comprised between 50 g and 1,500 g/m3 of screed or concrete.

The mixing and casting of hydraulic binders is carried out in the usual way. Advantageously, the admixture does not interfere with the setting of the hydraulic binder and does not affect the properties of the hardened material.

The admixture according to the invention thereby introduced into the bulk with the hydraulic binder gives the possibility of preventing the formation of a film formed with particles of calcium-based hydrates appearing after casting, setting and drying at the surface of the hydraulic binders. The absence of such a film notably allows an increase in the adherence of the finishing materials to the surfaces of hydraulic binders with admixtures and moreover improves the hardness of the surfaces.

According to a last aspect, the invention therefore aims at a method for preparing a hydraulic binder composition suitable for making screeds including the step consisting of adding to the hydraulic binder the admixture according to the invention with a dosage comprised between 50 and 1,500 g/m3 of screed or concrete.

The invention will be better understood by means of the examples hereafter, shown as an illustration and not as a limitation.

EXAMPLES

Example 1: Composition and Making of an Anhydrite Screed

In a kneader of the Rayneri type, a mortar with admixtures, based on anhydrous calcium sulfate is prepared, having the composition indicated in Table 1 below by following the following mixing procedure:
Dry homogenization of the sand at low speed between 0-30 seconds;
Prehumidification of the sand with ⅓ of total water between 30-60 seconds, and then stopping the kneader;
At 300 seconds, introduction of the anhydrous calcium sulfate with the admixture according to the invention and homogenization between 300-330 seconds at low speed;
Adding the remainder of the water with the dispersants between 330 and 390 seconds;
Kneading at low speed between 390 and 420 seconds;
Stopping the kneader for scraping the edges and the bottom of the bowl with a trowel between 420-450 seconds; and
Kneading at high speed between 450 and 510 seconds.

TABLE 1

Mortar composition based on anhydrous calcium sulfate.

| Component | Amount |
|---|---|
| Anhydrous calcium sulfate | 650 kg/m³ |
| 0/4 mm sand from Bernieres (France) | 1,350 kg/m³ |
| Dispersant (Chryso ® Fluid Premia 196, sold by CHRYSO, France) | 0.27% by weight* |
| Water | 280 kg/m³ |

*As a liquid based on the amount of anhydrous calcium sulfate

The spreading measured with the cone ($\varnothing_{upper}$=7 cm, $\varnothing_{lower}$=10 cm, height=6 cm) immediately after preparation was 260±10 mm. The thereby produced mortar is cast into square molds with oblique edges oiled beforehand with dimensions 40*40 cm so as to produce mortar slabs, and the surface of said mortar is subject to the passing of a bar for debubbling and leveling in order to obtain a smooth surface.

Example 2: Composition and Making of a Cement Screed

In a kneader of the Rayneri type, a mortar with admixtures, based on cement, is prepared having the composition indicated in Table 2 below, by following the following mixing procedure:
Dry homogenization of the sand at low speed between 0-30 seconds;
Prehumidification of the sand with ⅓ of total water between 30-60 seconds, and then stopping the kneader;
At 300 seconds, introduction of the cement and of the filler with the admixture according to the invention and homogenization between 300-330 seconds at low speed;
Addition of the remainder of the water with the dispersant between 330 and 390 seconds;
Kneading at low speed between 390 and 420 seconds;
Stopping the kneader for scraping the edges and the bottom of the bowl with a trowel between 420-450 seconds; and
Kneading at high speed between 450 and 510 seconds.

The spread measured with the cone ($\varnothing_{upper}$=7 cm, $\varnothing_{lower}$=10 cm, height=6 cm) immediately after preparation is 260±10 mm. The thereby produced mortar is cast into square molds with oblique edges oiled beforehand with dimensions 40*40 cm so as to produce mortar slabs, and the surface of the mortar is subject to the passing of a bar for debubbling and leveling in order to obtain a smooth surface.

TABLE 2

Cement-based mortar composition

| Component | Amount |
|---|---|
| Cement of the CEM I type | 280 kg/m³ |
| Durcal 10 filler (sold by OMYA, France) | 380 kg/m³ |
| Sand from Bernieres (France) | 1,280 kg/m³ |

TABLE 2-continued

Cement-based mortar composition

| Component | Amount |
| --- | --- |
| Dispersant (CHRYSO ® Fluid Optima 100, sold by CHRYSO, France) | 1.2% by weight* |
| Water | 260 kg/m$^3$ |

*as a liquid based on the amount of binder (cement + filler)

Example 3: Composition and Making of a Self-Compacting Concrete (SCC)

In a kneader of the Skako Couvrot type, an SCC with admixtures is prepared having the composition indicated in Table 3 below by following the following mixing procedure:
Dry homogenization of the sand and of the gravel at low speed between 0-30 seconds; Prehumidification of the sand with ⅓ of the total water of the whole of the granules between 30-60 seconds, and then stopping the kneader;
At 300 seconds, introduction of the cement and of the filler with the admixture according to the invention and dry kneading between 300-330 seconds;
Addition of the remainder of the water with the superplasticizer between 330 and 390 seconds; and
Stopping the kneader at 510 seconds.

The spread measured with the standardized cone (Abrams cone) of the concrete immediately after preparation is 700±10 mm. The thereby produced concrete is cast into square molds with oblique edges oiled beforehand with dimensions 40*40 cm so as to produce concrete slabs, and the surface of the concrete is subject to the passing of a bar for debubbling and leveling in order to maintain a smooth surface.

TABLE 3

Self-compacting concrete composition

| Component | Amount |
| --- | --- |
| Cement of the CEMI type | 280 kg/m$^3$ |
| Erbray filler (sold by OMYA, France) | 160 kg/m$^3$ |
| 0/4 sand from Bernieres (France) | 887 kg/m$^3$ |
| 6/10 gravel from Villermain (France) | 160 kg/m$^3$ |
| 9/18 gravel from the Loire (France) | 653 kg/m$^3$ |
| Dispersant (CHRYSO ® Fluid OPTIMA 350, sold by CHRYSO, France) | 0.7% by weight* |
| Water | 213 kg/m$^3$ |

*as a liquid based on the amount of binder (cement + filler).

Comparative Example 4: No Admixture

In order to evaluate the effect of the admixture according to the invention, a slab was prepared according to Example 1, without the admixture according to the invention.

A portion of the obtained slabs was evaluated as such, without any treatment (Example 4A) while another portion was subject to sanding (Example 4B).

Comparative Example 5: Fat Alone

In order to evaluate the affect of the admixture according to the invention, a mortar slab was prepared according to example 1 by further adding a mixture of 66% by weight of 1-hexadecanol and 33% by weight of 1-octadecanol marketed as NAFOL 1618 by SASOL (with $D_{50}\approx 40$ μm).

The fatty alcohol is introduced during the kneading at the same time as the hydraulic binder in an amount of 250 g/m$^3$ as indicated in Tables 4 and 5.

Example 6: Fat and Anti-Caking Agent

In order to evaluate the effect of the admixture according to the invention, a mortar slab was prepared according to Example 1 with additional addition of a mixture of 50% by weight of a mixture of 66% by weight of 1-hexadecanol and 33% by weight of 1-octadecanol and marketed as NAFOL 1618 by SASOL (with a $D_{50}\approx 40$ μm) and of 50% by weight of calcium carbonate ($D_{50}\approx 1.5$ μm).

The admixture according to the invention is introduced during the kneading at the same time as the hydraulic binder, in an amount of 500 g/m$^3$ as indicated in Tables 4 and 5.

Comparative Example 7: Fat and Shrinkage Reducing Agent

In order to evaluate the effect of the admixture according to the invention, a mortar slab was prepared according to Example 1 with further addition of a mixture of 66% by weight of 1-hexadecanol and 33% by weight of 1-octadecanol marketed as NAFOL 1618 by SASOL (with a $D_{50}\approx 40$ μm) and 2% by liquid of CHRYSO®Serenis (a shrinkage reducing agent marketed by CHRYSO, France).

The fatty alcohol is introduced during the kneading at the same time as the hydraulic binder, in an amount of 250 g/m$^3$ as indicated in Tables 4 and 5.

Evaluation of the Adherence

After 7 days, ceramic stoneware tiles with a size of 50×50 mm are stuck on the surface of the slabs obtained in Examples 4 to 7 above by means of a tile adhesive mortar (adhesive LANKO Prolidal Plus 5024 marketed by PAREX LANKO). This adhesive mortar is applied according to the NF EN 1348 standard which consists of:
spreading the adhesive mortar with a comb having square teeth 5×5×5 mm;
depositing a load of 2 kg for 25 to 35 seconds on each tile during the adhesive bonding, 9 tiles being stuck per slab;
drying the adhesive mortar for 21 days at room temperature (according to the conditions of the NF EN 1348 standard);
sticking removal tees on the ceramic tiles by means of an epoxy glue (LANKO 723, marketed by PAREX LANKO); and
removing the tiles one day later via the tees by measuring the required force with a dynamometer of the Dynatest type.

A fracture between two materials assembled by adhesive bonding may propagate in two ways: either inside the adhesive joint or the support (screed or concrete): this is then a cohesive failure, or at the surface and this is then referred to as an adhesive failure.

A cohesive failure indicates that the interface has behaved more strongly than the core of the adhesive or of the support (screed or concrete). Conversely, for an adhesive failure, the interface was weaker.

The failure mode (either adhesive or cohesive), as well as the traction force required for removing the tiles from the slabs provide an evaluation of the adherence capacity of the surfaces. The obtained results are grouped in Table 4 below.

It is seen that adherence is very weak for slabs without admixtures without any sanding treatment. Moreover, during the carrying out of the tests, better dispersion of the fatty alcohol in the screed is visually observed, when it is associated with the anti-caking agent.

It is seen that the admixture according to the invention allows covering of a surface with a traction stress close to that of a sanded surface, with a very clear economical advantage.

Moreover, it is noted that the association of a fatty alcohol with a shrinkage reducing agent increases the surface film and thereby further reduces the tensile stress of the surface.

TABLE 4

Evaluation of the adherence

| EXAMPLE | Admixtures/Treatment | Dosage in g/m³ | Tensile stress [MPa]/Failure mode |
|---|---|---|---|
| 4A | No admixture, non sanded | — | 0.4 MPa/adhesive |
| 4B | No admixture, sanded | — | 2.0 MPa/cohesive |
| 5 | Non-anti-caked fatty alcohol | 250 g/m³ | Inhomogeneous results due to poor dispersion of the product in the screed |
| 6 | Fatty alcohol + CaCO₃ | 500 g/m³ | 1.6 MPa/cohesive |
| 7 | Fatty alcohol + shrinkage reducing agent | 250 g/m³ | 0.6 MPa/adhesive |

Evaluation of the Surface Hardness

In order to evaluate the effect of the admixture according to the invention on the surface hardness, the slabs prepared in Examples 4 to 7 were tested by means of a device called a Perfotest type CSTB.

The Perfotest device allows reproducible impacts to be produced on horizontal surfaces. It is equipped with a 5-dihedra punch intended for measuring the hardness of a coating of class P2 and P3. According to the height at which the punch is released, a different force is applied, P3 being greater than P2. The results are expressed as a number of detached, degraded or intact squares. Thus, the larger the number of intact squares, the greater is the surface hardness or less the surface film is present, both for a classification of type P2 and of type P3. The tests are directly conducted at the surface of the slabs free of any surface coating. The measurements are conducted 4 times in different locations on each slab both on the tests of type P2 and of type P3.

The results of the test are recorded in the Table 5 below.

It is seen that the surface hardness is very low for slabs without any addition of the admixture according to the invention without any sanding treatment. Moreover, when conducting the tests, better dispersion of the fatty alcohol in the screed is visually observed when it is associated with the anti-caking agent.

Moreover, the association of a fatty alcohol with a shrinkage reducing agent increases the surface film and thus further reduces the surface hardness.

TABLE 5

Evaluation of the surface hardness

| EXAMPLE | Admixtures/Treatment | Dosage in g/m³ | Surface hardness |
|---|---|---|---|
| 4A | No admixture according to invention, non sanded | — | -- |
| 4B | No admixture according to invention, sanded | — | + |
| 5 | Fatty alcohol | 250 g/m³ | Inhomogeneous results due to poor dispersion of the product in the screed |
| 6 | Fatty alcohol + CaCO₃ | 500 g/m³ | ++ |
| 7 | Fatty alcohol + shrinkage reducing agent | 250 g/m³ | --- |

The admixture according to the invention therefore allows a notable improvement in the surface hardness and the adherence capacity of surfaces of hydraulic binders based on cement or on calcium sulfate while being easily dispersible and stable upon storage.

The invention claimed is:

1. A process for forming an anhydrite screed with reduced formation of a surface film at a surface of the screed compared to a screed produced without an admixture, comprising:
   preparing an anhydrous calcium sulfate (anhydrite) mortar composition; and
   adding water and an admixture to the anhydrite mortar composition to form a screed;
   wherein the screed comprises the admixture of 40-60% by dry weight of at least one fatty alcohol and 60-40% by dry weight of at least one anti-caking agent,
   wherein an amount of the admixture in the screed is between 50 and 1,500 g/m³,
   wherein the screed does not comprise Portland cement;
   whereby the screed exhibits reduced formation of the surface film compared to screeds produced without the admixture.

2. The process according to claim 1, wherein the fatty alcohol is a primary fatty alcohol.

3. The process according to claim 1, wherein the fatty alcohol includes 8 to 22 carbon atoms.

4. The process according to claim 2, wherein the fatty alcohol is hexadecan-1-ol or octadecan-1-ol.

5. The process according to claim 4, wherein the anti-caking agent has an average particle size comprised between 0.01 and 100 µm.

6. The process according to claim 1, wherein the anticaking agent is a carbonate, silicate or oxide.

7. The process according to claim 6, wherein the anticaking agent is calcium carbonate, kaolin, alumina or silica.

8. The process according to claim 1, wherein the anticaking agent is a mineral or organic coloring agent.

9. The process according to claim 1, wherein the admixture comprises a colored anticaking agent.

10. The process according to claim 1, wherein the admixture is in the form of powder.

11. The process according to claim 1, wherein the admixture is added to the anhydrite before the water for mixing.

12. A process according to claim 1, wherein the at least one fatty alcohol and the at least one anti-caking agent are each added as a powder to the anhydrite.

13. A process for preparing an anhydrite mortar composition, the method consisting of:
   (i) preparing an admixture by mixing:
      at least one fatty alcohol;
      at least one anti-caking agent, and one or more additional ingredients selected from the group consisting of an antifoam agent, a plasticizer and a setting modifier, wherein the admixture comprises 40 to 60% by weight of fatty alcohol and 60 to 40% by weight of anti-caking agent, and an amount of the admixture in the screed is between 50 and 1,500 g/m$^3$; and (ii) adding said admixture to the anhydrite mortar composition, wherein the anhydrite mortar composition comprises anhydrous calcium sulfate, sand, dispersant and water, and wherein the anhydrite mortar composition does not contain Portland cement.

14. The process according to claim 13, wherein the admixture is added to the anhydrite mortar composition in the absence of water.

15. A process for preparing an anhydrite mortar composition consisting of:

(ii) preparing an admixture by mixing components consisting of:

at least one fatty alcohol;

at least one anti-caking agent, and one or more additional ingredients selected from the group consisting of an antifoam agent, a plasticizer and a setting modifier, wherein the admixture comprises 40 to 60% by weight of fatty alcohol and 60 to 40% by weight of anti-caking agent, and an amount of the admixture in the screed is between 50 and 1,500 g/m$^3$; and (ii) adding said admixture to the anhydrite mortar composition, wherein the anhydrite mortar composition consists of anhydrous calcium sulfate, sand, dispersant and water.

* * * * *